United States Patent [19]
Fulop

[11] Patent Number: 5,882,208
[45] Date of Patent: Mar. 16, 1999

[54] VISUAL AID SYSTEM DESIGNED TO TEACH AND ENTERTAIN INFANTS FROM BIRTH TO 6 MONTHS WHILE THEY ARE IN A STROLLER

[76] Inventor: Rita Fulop, 596 Rhein Ct., New Milford, N.J. 07646

[21] Appl. No.: 950,951

[22] Filed: Oct. 15, 1997

[51] Int. Cl.⁶ .................................................. G09B 25/00
[52] U.S. Cl. ........................................... 434/365; 434/236
[58] Field of Search .................................. 434/365, 366, 434/367, 368, 236, 237, 428, 307 R, 238, 258; 446/227; 250/30

[56] References Cited

U.S. PATENT DOCUMENTS

| | | |
|---|---|---|
| 2,078,022 | 4/1937 | Roemer . |
| 2,883,678 | 4/1959 | Heffernan et al. . |
| 3,213,565 | 10/1965 | Grosz . |
| 3,828,888 | 8/1974 | Gottschalk .............................. 181/33 R |
| 4,044,482 | 8/1977 | Mosch .................................... 40/129 C |
| 4,968,279 | 11/1990 | Smith ....................................... 446/227 |
| 5,425,546 | 6/1995 | Gerber et al. ........................ 446/227 X |
| 5,634,796 | 6/1997 | Dollar ...................................... 434/426 |
| 5,702,039 | 12/1997 | Olaiz ................................... 446/227 X |

*Primary Examiner*—Kien T. Nguyen
*Attorney, Agent, or Firm*—Plevy & Associates

[57] ABSTRACT

A method for teaching and entertaining infants while lying on their back in a stroller, the stroller including a stroller hood, including first, attaching a planar member suitable for displaying visual images to an infant while the infant is lying on his back in a stroller and for mounting on an inside cover of a stroller hood, to the stroller hood in such a way as to be within the visual field of the infant while the infant is lying on his back in the stroller. And second, using a means of attaching the planar member to the inside of the stroller hood.

17 Claims, 2 Drawing Sheets

VISUAL AID SYSTEM DESIGNED TO TEACH AND ENTERTAIN INFANTS FROM BIRTH TO 6 MONTHS WHILE THEY ARE IN A STROLLER

RELATED APPLICATION

Application 08/586,983, filed Jan. 16, 1996, by Rita Fulop, entitled A VISUAL AID SYSTEM DESIGNED TO TEACH AND ENTERTAIN INFANTS FROM BIRTH TO SIX MONTHS WHILE THEY ARE IN A STROLLER, which has been abandoned.

FIELD OF INVENTION

This invention relates in general to the visual stimulation and/or entertainment of children, and particularly for an infant while lying in a stroller.

BACKGROUND OF THE INVENTION

Child development studies have clearly demonstrated the benefits of early visual stimulation for learning and entertainment. Furthermore, such visual stimulation must be presented within the visual field of the infant, of a form the infant can perceive, and for a suitable period of time.

Infants between birth and six (6) months of age typically spend a significant amount of time lying on their backs in strollers facing upwards. This position is now considered the healthiest for infants. While positioned in a stroller an infant has nothing to provide visual stimuli, except the inside of the stroller hood as manufactured. This customarily fails to meet the requirements before mentioned for maximizing educational effect.

Conventional methods and apparatus for visual stimulation of infants, such as crib mobiles, books, flash cards, and television are impractical, inappropriate, and/or ineffective for infants lying on their backs in strollers.

Crib mobiles allow an infant lying under them only to view their underside, this is typically small in surface area, and limited in use. While typically entertaining to adults located nearby, mobiles often fail to adequately stimulate the infant. Additionally, crib mobiles are not well suited for carriages. As carriages are mobile in nature, movement of the carriage may generate a swinging motion of a mobile which may present an unsafe condition for an infant lying therein. Furthermore, crib mobiles exhibit the inability to readily change the pictorial source of visual stimulation as is necessary to optimize educational effect.

Books and flash cards allow for such a changing of the pictorial source of visual stimulation but require the assistance of an older individual to hold for and read to the infant.

Television or video display monitors provide an entire new class of problems. Each requires a portable power source and imposes risks of radiation, electrocution, injury due to fall and the like. The cost, weight, and risks of these systems all make them inappropriate.

While a search of relevant patent literature discloses several patents relating to the presentation of visual stimuli to children, none discloses a method for the visual stimulation of infants lying on their backs in strollers which allows for easy modification of the visual image resulting in said stimulation.

U.S. Pat. No. 2,883,678 (Heffernan Et Al.) Discloses a cloth crib canopy which may contain certain pictorial designs. The designs are effectively on the underside of the cover, within the visual field of the infant, and provide limited visual stimuli and entertainment for the infant, however the designs forementioned, on the underside of the crib canopy, are permanent in nature, and cannot be readily changed as is necessary for optimal educational effect. Additionally, Heffernan teaches a method of attachment not readily applicable to strollers.

U.S. Pat. No. 6,634,796 (Dollar) teaches a method for delivering visual stimulation to a child lying in a crib. A substantially flat panel of transparent rigid material, such as Plexiglass (methyl acrylic plastic) is described. However the substantially flat rigid panel is inappropriate for use in a stroller as attachment and safety are significant hurdles to any such use. The Plexiglass panel would be inflexible and difficult to attach, also the risk of injury to the infant would be significant as a substantially flat rigid panel of significant weight would be suspended above the infants head. Additionally, like Heffernan, the method of attachment taught in Dollar would be inapplicable for stroller hoods as no "top railings" over which said substantially flat rigid panel can be placed and affixed typically exists.

U.S. Pat. No. 3,828,888 (Gottschalk) teaches a bell shaped plastic device. While Gottschalk addresses the issue of providing stimulation for a child lying on his back in a stroller, it contains the same design flaw as illustrated in Heffernan, the inability to readily change the pictorial source of visual stimulation which, as discussed, is necessary to optimize educational effect.

Thus, it is the object of the present invention to address the need of providing effective visual stimulation, capable of easy modification, for infants lying on their backs in strollers.

SUMMARY OF THE INVENTION

The method of the present invention for teaching or entertaining an infant lying on his back in a stroller includes, selecting a planar member from a group of planar members, each having indicia selected to provide effective visual stimulation for an infant, and each being suitable for mounting on a stroller hood of a stroller, respectively. Positioning said selected planar member adjacent to said stroller hood of said stroller in such a way as to be within the visual field of an infant lying on his back in said stroller. And, coupling said selected planar member to said stroller hood using suitable means.

BRIEF DESCRIPTION OF THE FIGURES

For a fuller understanding of the nature and objects of the present invention reference should be made by the following detailed description taken in with the following illustrations in which.

DETAILED DESCRIPTION OF THE INVENTION

Briefly stated, the invention teaches a method for providing necessary, varying visual stimulation for a infant lying on his back in a stroller. The method of the invention includes positioning a first planar member with appropriate qualities adjacent to a stroller hood of a stroller in such a way as to be within the visual field of an infant lying on his back therein, second, coupling said first planar member to said inside of said stroller hood using suitable means, and third, substituting a second planar member with appropriate qualities in place of said first planar member, to maximize said infant's visual stimulation.

The invention will now be described in greater detail with reference to the drawings.

The method according to the invention includes positioning an appropriate planar member so that it is adjacent to a stroller hood of a stroller in such a way as to be within the visual field of an infant lying on his back within the stroller. Coupling the appropriate planar member to said stroller hood in such a way as to render it readily removable. And, substituting another appropriate planar member for the first in order to maximize the infant's visual stimulation and thus the educational and/or entertaining effect on the infant.

An appropriate planar member should be suitable for both, displaying visual images to an infant lying on his back in a stroller, and for coupling to a stroller hood in such a way as to render it readily removable, and yet sufficiently safe for the infant lying on his back thereunder. Additionally, because infants are not capable of instant retention, said appropriate planar member should be sufficiently strong and durable for continued use.

Figure 1:
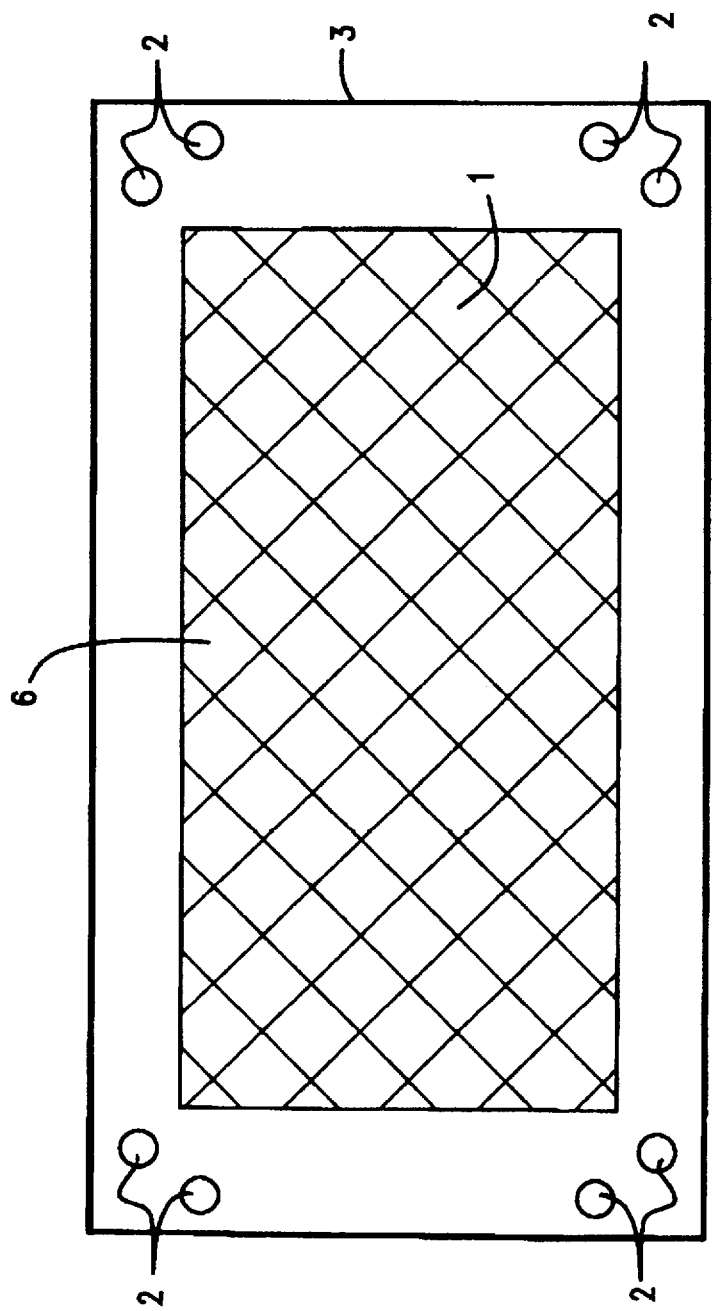
FIG. 1 is a bottom view of the display device with means for attachment with pins.

A preferred embodiment takes the form of a lightweight sheet of vinyl, foam, or combination thereof, with screened printing on an underside as illustrated by FIG. 1. FIG. 1. illustrates the underside or bottom view of the planar member 3. Said underside 1 is the portion of the device viewable by the infant while lying in a stroller on his back, and accordingly the area containing said screened printing 6. Said screened printing 6 should be suitable for providing visual stimulation resulting in the education, and/or entertainment of the infant lying in the stroller on his back; it may comprise original designs, shapes, faces, animals, and abstract drawings planned to accomplish this intended result.

In a preferred embodiment, as illustrated by FIG. 1, said planar member may have holes 2 in planar member 3 suitable for attachment via pins to the underside of a stroller hood after the planar member has been properly positioned adjacent thereto. Safety pins are preferred.

Figure 2:
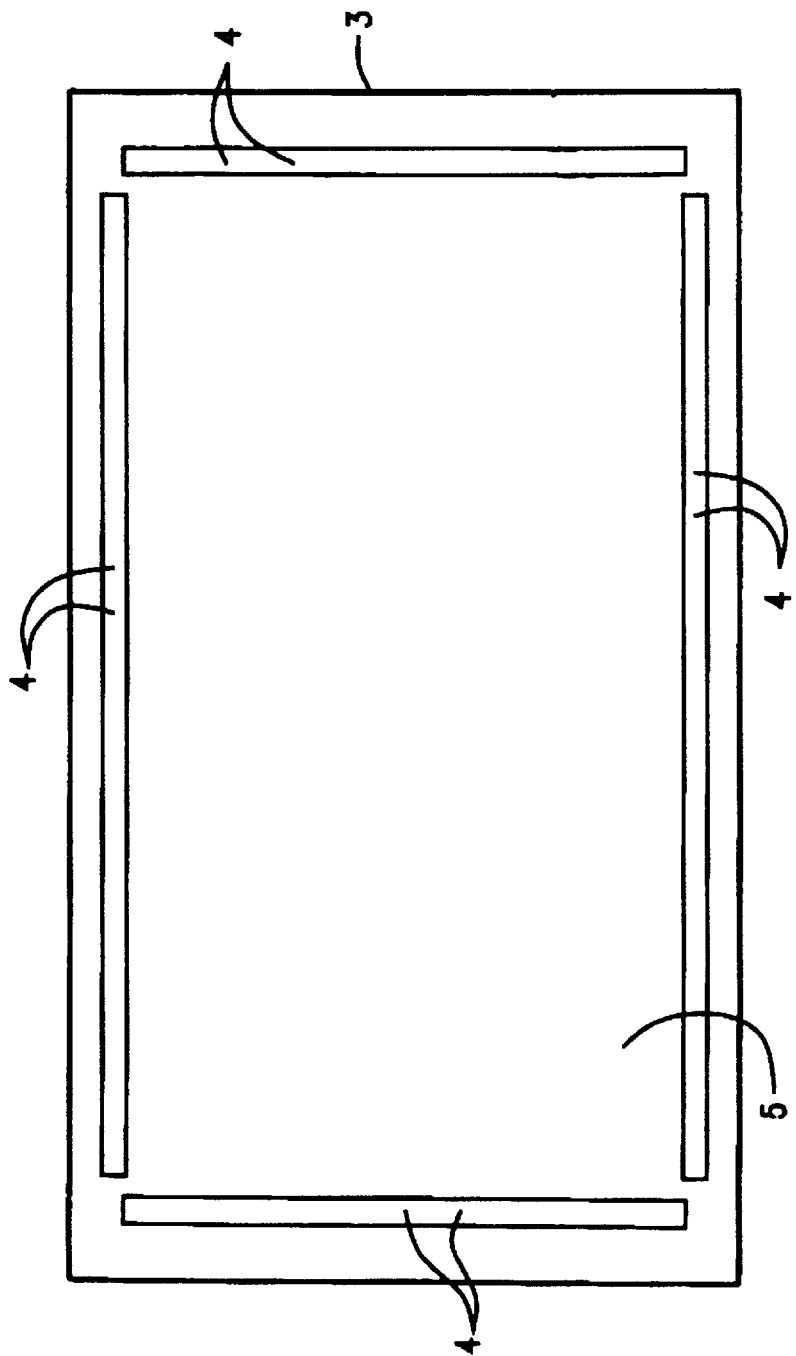
FIG. 2 is a top view of the display device with means for attachment with an adhesive

Alternatively, an adhesive means may be utilized for said same purpose of attaching said planar member to the underside of the stroller hood after the planar member has been properly positioned adjacent thereto. FIG. 2. illustrates the upper side or top view of said planar member 3 with means of attachment for an adhesive substance 4. Adhesive strips 4, preferably double-sided tape, are set parallel, on a top side 5 of the planar member 3, to each of the edges of planar member 3 at a suitable distance from the edge for use in attaching planar member 3 to the underside of the stroller hood.

I claim:

1. A method for teaching or entertaining an infant lying on his back in a stroller comprising:
    providing a group of planar members, each having indicia selected to provide effective visual stimulation for an infant, and each being suitable for mounting on a stroller hood of a stroller, respectively;
    selecting a planar member from said group of planar members;
    positioning said selected planar member adjacent to said stroller hood of said stroller in such a way as to be within the visual field of an infant lying on his back in said stroller; and,
    coupling said selected planar member to said stroller hood using suitable means.
    wherein said infant is between birth and six (6) months of age;
    wherein said planar members are flexible, respectively, have a top side and a bottom side, respectively, and said bottom side of said planar members comprise screened printing, respectively;
    wherein said screened printing is suitable for visually stimulating an infant between birth and six (6) months of age; and,
    wherein said stroller hood has a bottom side and a top side, and said top side of said selected planar member is coupled to said bottom side of said stroller hood.

2. The method of claim 1, wherein the step of providing a group of planar members further comprises the step of providing a group of planar members each comprising a vinyl sheet.

3. The method of claim 1, wherein the step of providing a group of planar members further comprises the step of providing a group of planar members each comprising a foam sheet.

4. The method of claim 1, wherein said step of coupling said top side of said selected planar member to said bottom side of said stroller hood further comprises the step of utilizing punched out holes in each of said planar members.

5. The method of claim 1, wherein said step of coupling said top side of said selected planar member to said bottom side of said stroller hood further comprises the step of utilizing safety pins.

6. The method of claim 1, wherein said step of coupling said top side of said selected planar member to said bottom side of said stroller hood further comprises the step of utilizing an adhesive substance having a first adhesive side and a second adhesive side.

7. The method of claim 6, wherein said step of coupling said top side of said selected planar member to said bottom side of said stroller hood further comprises the step of coupling said first adhesive side of said adhesive substance to said bottom side of said stroller hood, and coupling said second adhesive side of said adhesive substance to said top side of said selected planar member.

8. A method for teaching or entertaining an infant lying on his back in a stroller comprising:
    providing a group of planar members, each member of said group respectively having:
        a top side and a bottom side,
        indicia selected to provide effective visual stimulation for an infant, and
        each being suitable for mounting on a stroller hood of a stroller, said stroller hood also having a top side and a bottom side;
    selecting a planar member from said group of planar members;
    positioning said selected planar member adjacent to said stroller hood of said stroller in such a way as to be within the visual field of an infant lying on his back in said stroller; and,
    coupling said top side of said selected planar member to said bottom side of said stroller hood using suitable means.

9. The method of claim 8, wherein the step of providing a group of planar members further comprises the step of providing a group of flexible planar members.

10. The method of claim 8 wherein the step of providing a group of planar members further comprises the step of providing a group of planar members each comprising a vinyl sheet.

11. The method of claim 8, wherein the step of providing a group of planar members further comprises the step of providing a group of planar members each comprising a foam sheet.

12. The method of claim 8 further comprising the step of providing screened printing on said bottom side of each of said group of planar members.

13. The method of claim 12, wherein said step of providing screened printing further comprises the step of providing screened printing suitable for visually stimulating an infant between birth and six (6) months of age.

14. The method of claim 8, wherein said step of coupling said top side of said selected planar member to said bottom side of said stroller hood further comprises the step of utilizing punched out holes in each of said planar members.

15. The method of claim 8, wherein said step of coupling said top side of said selected planar member to said bottom side of said stroller hood further comprises the step of utilizing safety pins.

16. The method of claim 8, wherein said step of coupling said top side of said selected planar member to said bottom side of said stroller hood further comprises the step of utilizing an adhesive substance having a first adhesive side and a second adhesive side.

17. The method of claim 16, wherein said step of coupling said top side of said selected planar member to said bottom side of said stroller hood further comprises the step of coupling said first adhesive side of said adhesive substance to said bottom side of said stroller hood, and coupling said second adhesive side of said adhesive substance to said top side of said selected planar member.

* * * * *